UNITED STATES PATENT OFFICE.

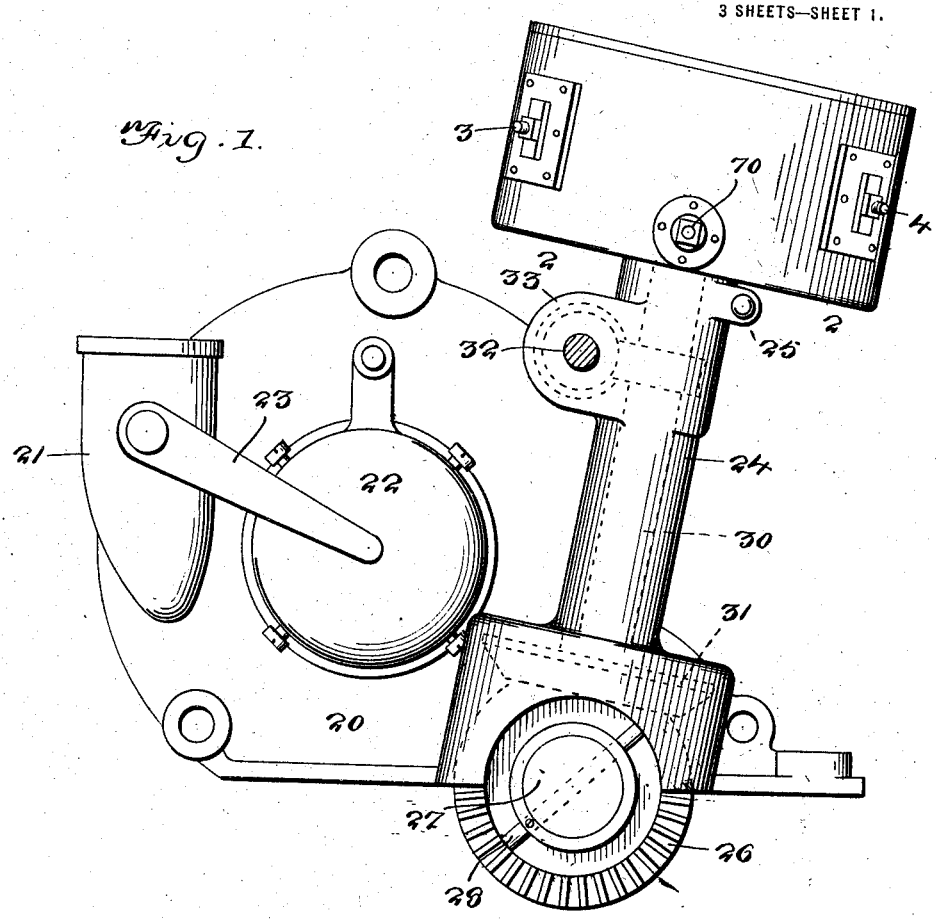

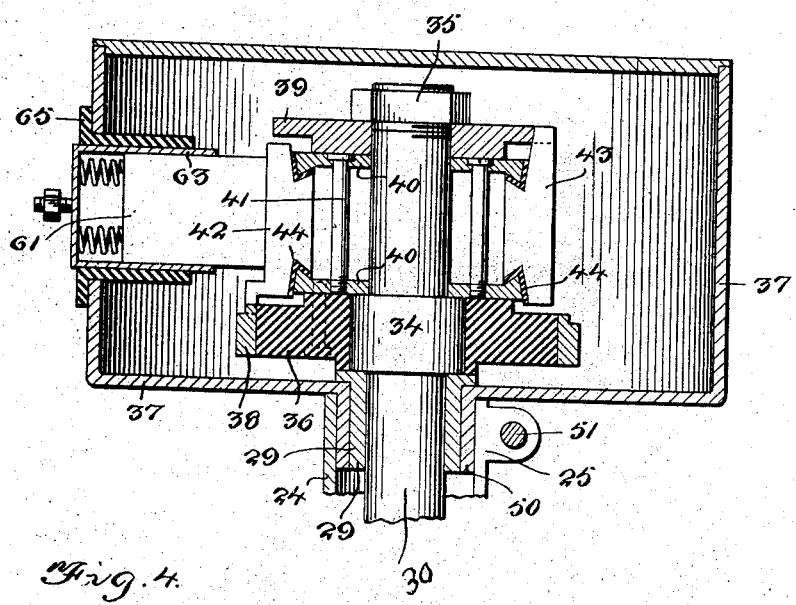
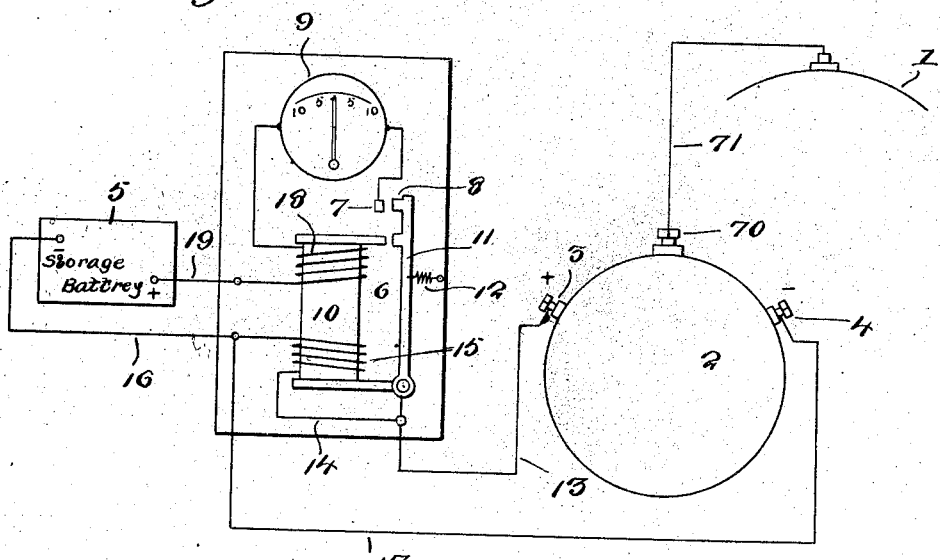

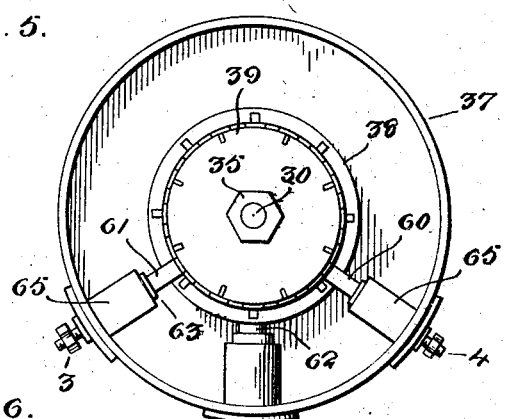
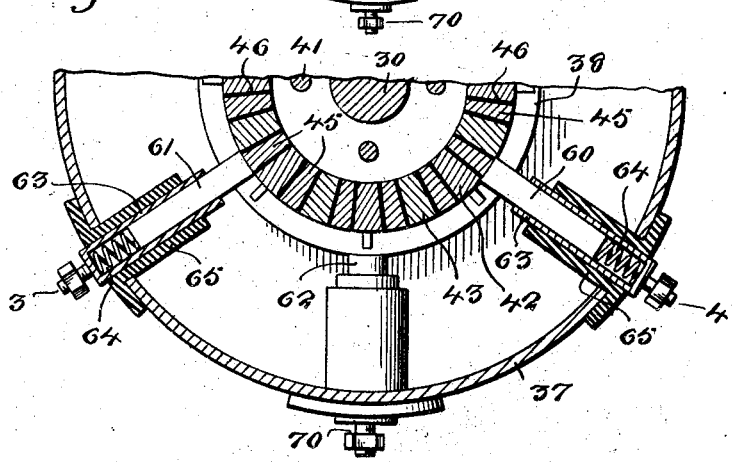
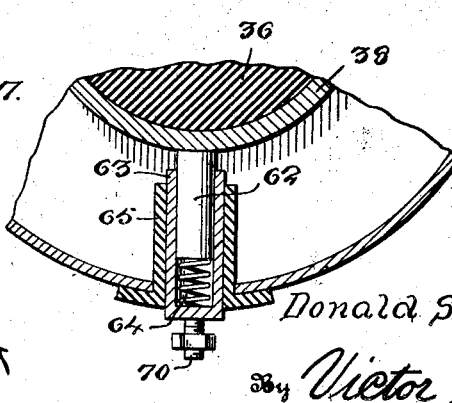

DONALD S. SCARBOROUGH, OF ST. LOUIS, MISSOURI, ASSIGNOR TO PETER DOUROS, OF EAST ST. LOUIS, ILLINOIS.

COMMUTATOR AND BATTERY-CHARGING OUTFIT INCLUDING THE SAME.

1,421,998.  Specification of Letters Patent.  Patented July 4, 1922.

Application filed April 11, 1919. Serial No. 289,351.

*To all whom it may concern:*

Be it known that I, DONALD S. SCARBOROUGH, a citizen of the United States, residing at St. Louis, in the county of St. Louis and State of Missouri, have invented new and useful Improvements in Commutators and Battery-Charging Outfits Including the Same, of which the following is a specification.

One of the objects of my present invention is the provision of a commutator in which short circuiting is averted and loss of current thereby prevented.

Another object of the invention is the provision of a battery-charging outfit that is at once simple and efficient by virtue of the employment in the manner disclosed of an automatic cut-out or relay in combination with the rectifier and the storage battery, the rectifier including my novel commutator.

Another object of the invention is the provision of a commutator of improved and advantageous construction.

Another object is the provision of a construction which as a whole is adapted for use to advantage upon Ford and other automobiles.

Other objects and practical advantages of the invention will be fully understood from the following description and claims when the same are read in connection with the drawings, accompanying and forming part of this specification, in which:

Figure 1 is a front view illustrative of the arrangement of one specific embodiment of my invention on a Ford automobile.

Figure 2 is a transverse section taken in the plane indicated by the line 2—2 of Figure 1.

Figure 3 is a diagrammatical section through the rectifier.

Figure 4 is a diagrammatic view illustrative of the general arrangement.

Figure 5 is a detail view of the rectifier.

Figure 6 is a fragmentary section of the same.

Figure 7 is a detail section showing the intermediate brush and brush holder of the arrangement.

Similar numerals of reference designate corresponding parts in all of the views of the drawings.

For convenience of description, reference will first be had to the diagrammatic view, Figure 4, wherein 1 is a magneto, 2 a rectifier for changing the alternating current into a direct current, 3 the positive terminal of the rectifier, 4 the negative terminal of said rectifier, 5 a storage battery, 6 a relay or automatic cut-out, 7 and 8 relay points, and 9 a testing medium, such, for instance, as an ammeter, which latter is preferably, though not necessarily, employed. The relay 6 comprises a magnetic core 10 and an armature 11, subject to the action of a spring 12. The positive terminal 3 of the rectifier is connected through a wire 13 with the armature 11, and from said wire 13 leads a short wire 14 that merges into a shunt coil 15 about the core 10, which shunt coil 15 merges into a wire 16 that leads to the negative pole of the battery, as indicated. Intermediate the negative terminal 4 of the rectifier and a point between the coil 15 and the storage battery, is a wire 17. The contact 7 is connected electrically through wires or other conductors and the ammeter 9, or through a conductor alone with a reverse current coil 18, disposed about the core 10 and merging into a wire or other conductor 19 that is connected as indicated with the positive pole of the battery 5.

With the foregoing synopsis in mind, the general operation of the battery-charging outfit part of my invention will be fully understood when it is stated that with the engine from which the magneto and the rectifier derive motion running at a low rate of speed, and when the voltage of the current passing from the rectifier is less than that of the battery, the current passes from the rectifier terminal 3, through the wires 13 and 14, the shunt coil 15 and the wire 17 to the negative rectifier terminal 4. When, however, the speed of the engine increases and the voltage of current passing from the rectifier becomes greater than that of the battery, the increased current passing through the shunt coil 15 magnetizes the core 10 so that the magnetism of the pole pieces of the core 10 overcomes the tension of the spring 12 and draws the armature 11 to the core, thereby drawing and holding the contact 8 against the contact 7. Positive current then passes from the rectifier terminal 3 through the wire 13, the armature 11, the points 8 and 7, the ammeter 9, the reverse current coil 18 and the wire or other conductor 19 to the positive pole of the battery. Such current passes through the plates of the battery and through the negative pole thereof, and then by way of the conductors 16 and 17 to the negative terminal 14 of the rectifier. This condition obtains until the voltage of the current supplied by the magneto falls below that of the battery, when the current from the battery accumulates in the reverse current coil 18 and thereby neutralize the polarity of the poles of the magnet or core 10, whereupon the spring 12 will pull the armature to the position shown in Figure 4, and thereby separate the contact 8 from the contact 7. When the speed of the engine is again increased and the voltage supplied by the magneto reaches a point above that of the voltage of the battery, the operation described is repeated. I prefer to employ an ammeter or some other testing medium in the relation described, but I do not desire to be understood as confining myself to the employment of a testing medium.

In Figure 1, I show the preferred specific construction of the battery-charging outfit part of my invention, and by reference to said figure it will be understood that 20 is the cover of a timing gear case, 21 is a breather pipe or oil cup, 22 is a timer and 23 is a flat spring which holds the timer in the ordinary well known manner. In furtherance of my invention I form a housing 24 integral with the cover 20, and I also provide the said housing with a clamping portion 25, Figures 1 and 2. The low and comparatively large portion of the housing 24 is arranged over a miter gear 26 fixed on the crank shaft 27 of a Ford or other suitable automobile engine. The said shaft is shown as equipped with a pin 28 for the application of a starting crank, but this of course is not of my invention. Journaled in a bushing 29 that is held in the clamp portion 25 of the housing 24, Figure 3, is a commutator shaft 30, having at its lower end a miter gear 31, intermeshed with the gear 26. The said shaft 30 is preferably connected through gearing with a fan shaft 32, journaled in a bracket portion 33 on the housing 24 so as to utilize the shaft 30 for the driving of the fan shaft, and in that way contribute to the simplicity and compactness of the installation as a whole. At an intermediate point, Figure 3, and above the bushing 29, the shaft 30 is equipped with an abutment 34, and at its upper end the shaft is threaded, as shown, to receive a nut 35. Surrounding the abutment 34 and superimposed on the bushing 29 is an insulating annulus 36 which, together with the upper portion of the shaft is disposed in the rectifier casing 37. Surrounding and carried by the said annulus 36 is a collector ring 38 which forms part of the rotary member of my novel commutator. In addition to the said collector ring 38, the rotary commutator member comprises a head 39 electrically connected through the shaft 30 with the ground, clamp members 40 arranged against the opposed sides of the annulus 36 and the head 39, bolts 41 connecting the said clamp members, and live conductive segments 42 and 43 interposed between the ribbed marginal portions of the clamping members 40 and separated therefrom by insulation 44, and also separated from the alternate and comparatively narrow dead segments 45 (see dotted lines in Figure 3 and full lines in Figure 6) by mica or other suitable insulation 46. The segments 42, 43 and 45 are preferably of copper, and the segments 42 and 43 are arranged in alternate relation with dead segments 45. More specifically a dead segment 45 is interposed between each pair of live segments 42 and 43. Figure 3 makes clear the fact that the segments 42 contact with the collector ring 38, but are isolated from the grounding head 39; also, the fact that the segments 43 contact with the grounding head 39 but are isolated from the collector ring 38.

As will be readily understood by comparison of Figures 1 and 3, the rectifier case 37 is sleeved at 50 and has said sleeve arranged in the clamp portion 25 of the housing 34. From this it follows that by loosening the nut on the bolt 51, the casing is rendered free to be rotated about the axis of the rotary member of the commutator for the ready adjustment or setting of the brushes 60, 61 and 62, all of which are preferably of carbon. Each brush is disposed in a holder 63 and backed by a spring 64, and each brush holder 63 is disposed in a bushing 65, carried by the case 37. I would also have it understood at this point that each of the brushes 60 and 61 has the width of its inner end determined by the distance between the live segments 42 and 43. In other words, the inner ends of each brush 60 and 61 is sufficiently wide to span the interposed dead segment 45 and the insulating portions 46 at the opposite sides of the same, so that as one segment 42 or 43 passes out of engagement with the inner end of one brush 60 or 61, the following segment 42 or 43 will have reached a position in contact with the inner end of the brush 60 or 61. Manifestly when desired, instead of merely contacting with the ground head 39, as shown in Figure 3, the segments 43 may be permanently connected in any approved manner to the head 39. Likewise in lieu of having the segments 42 contact with the collector ring 38, as shown in Figure 3, said segments 42 may be permanently connected with the collector ring 38, without involving departure from the scope of my claimed invention. I prefer, however, to employ the construction shown in Figure 3, because it materially facilitates the assembly of the parts that enter into the rotary member of the commutator. The interposition of the dead segments 45 between the live segments 42 and 43 is a highly important feature of my novel commutator, inasmuch as they assure a quick switch action, and in that way eliminate short circuiting and sparking and consequent wastage of current. Obviously a commutator characterized as just stated may be used to material advantage in electrical installations other than battery-charging outfits.

The terminals of the brushes 61 and 60 or the before mentioned terminals 3 and 4, respectively, and the terminal 70 of the brush 62 is electrically connected to a wire 71 or other suitable means with the magneto as shown diagrammatically in Figure 4.

Experience has demonstrated that with the rotary member of the commutator driven from the working part of an engine, short circuiting and sparking in the commutator is practically eliminated, and that because of this and the reliable action of the relay or automatic cut-out 10, the battery 5 will be adequately charged, whenever the same is necessary.

While the battery is charging, the reverse current coil 18 holds the armature without loss of current passing through the shunt coil, the current as usual taking the path of least resistance.

The only elements of my apparatus that require adjustment are the commutator brushes.

The commutator in the installation illustrated must have the same number of live segments as poles of magneto.

Having described my invention, what I claim and desire to secure by Letters-Patent, is:

1. The combination of a cover, a housing integral with said cover and having a comparatively large lower portion and a sleeve extending upwardly from said lower portion and provided with an upper clamp portion, a shaft having a miter gear interposed in the lower portion of the housing, a shaft disposed in the sleeve portion of the housing and having a miter gear intermeshed with that of the first-named portion, a commutator rotor fixed on the second-named shaft, above the housing, and a casing carrying brushes opposed to said rotor member and having a portion disposed in the clamp portion of the housing, whereby the casing may be turned about the second-named shaft for the adjustment or setting of the brushes.

2. A rotary commutator member comprising a shaft having an abutment, an insulating annulus surrounding said abutment, a collector ring surrounding said annulus, a ground head surrounding the shaft and spaced from said abutment and annulus, clamp members surrounding the shaft and connected together in spaced relation between the abutment and the ground head and having inwardly extending clamping portions, and live segments and dead segments having dove-tail portions interposed between and held by said inwardly extending portions of the clamp members, some of the live segments being in electrical connection with the collector ring and the alternate live segments in electrical connection with the ground head, and the dead segments being interposed between the alternate live segments and insulated therefrom, and all of the segments being adapted for opposition to brush means.

In testimony whereof I affix my signature.
DONALD S. SCARBOROUGH.